United States Patent
Frank et al.

[15] 3,691,093
[45] Sept. 12, 1972

[54] EFFICIENCY OF NICKEL-ALUMINUM CATALYSTS BY WATER WASHING

[72] Inventors: Herman J. Frank, Seabrook; Irving Moch, Jr., Harris County, both of Tex.

[73] Assignee: E. I. du Pont de Nemours and Company, Wilmington, Del.

[22] Filed: Feb. 12, 1969

[21] Appl. No.: 798,766

[52] U.S. Cl............252/420, 252/411 R, 252/466 Q, 260/635 M, 260/635 Y, 260/642
[51] Int. Cl..........................B01j 11/02, B01j 11/30
[58] Field of Search.................252/420, 412, 477 Q; 260/635 M

[56] References Cited

UNITED STATES PATENTS

| | | | |
|---|---|---|---|
| 2,174,651 | 10/1939 | Byrkit | 260/631 H |
| 2,222,302 | 11/1940 | Schmidt et al. | 260/635 M |
| 2,232,674 | 2/1941 | Pyzel | 260/641 |
| 2,319,707 | 5/1943 | Reppe et al. | 260/635 M |
| 2,604,455 | 7/1952 | Reynolds et al. | 252/412 |
| 2,863,928 | 12/1958 | Indest | 252/412 |
| 2,950,260 | 8/1960 | Rosenbaum | 252/477 Q |
| 2,967,893 | 1/1961 | Hort et al. | 260/635 M |
| 3,154,589 | 10/1964 | Moore | 260/635 Y |
| 3,232,996 | 2/1966 | Graham et al. | 260/635 Y |
| 3,479,411 | 11/1969 | Adam et al. | 260/635 M |
| 1,915,473 | 6/1933 | Raney | 252/477 Q |
| 3,544,485 | 12/1970 | Taira et al. | 252/477 Q |

FOREIGN PATENTS OR APPLICATIONS

| | | | |
|---|---|---|---|
| 508,944 | 6/1939 | Great Britain | 260/635 M |
| 647,363 | 12/1950 | Great Britain | 260/632 HF |
| 698,019 | 10/1953 | Great Britain | 260/635 M |
| 833,592 | 4/1960 | Great Britain | 252/412 |

*Primary Examiner*—Daniel E. Wyman
*Assistant Examiner*—P. E. Konopka
*Attorney*—Robert E. Partridge

[57] ABSTRACT

The method of increasing the efficiency for the conversion of 2-butyne-1,4-diol to saturated products of a granular, foraminous catalyst which has been activated by removing about 5–30 percent of the aluminum from a nickel-aluminum alloy containing about 35–60 percent by weight of nickel and about 40–65 percent by weight of aluminum after such efficiency has been reduced through extended use as a fixed-bed catalyst in the continuous hydrogenation of an aqueous mixture containing about 20–70 percent by weight of 2-butyne-1,4,-diol and about 30–80 percent by weight of water at a temperature of about 60°–150°C. under a hydrogen pressure of 2,500–5,500 psi. and a superficial gas velocity of at least about 0.5 foot per minute which comprises washing the catalyst with a wash medium consisting essentially of water in combination with a pressure which is less than the reaction pressure, the volume of said wash medium being at least about 50 percent of the volume of the catalyst bed.

5 Claims, No Drawings

EFFICIENCY OF NICKEL-ALUMINUM CATALYSTS BY WATER WASHING

BACKGROUND OF THE INVENTION

1. Field of the Invention

This invention relates to the production of 1,4-butanediol, hereinafter referred to as butanediol, by the hydrogenation of 2-butyne-1,4-diol, hereinafter referred to as butynediol.

2. Description of the Prior Art

In U. S. application Ser. No. 795,722, filed Jan. 31, 1969, now abandoned an improved process for the hydrogenation of aqueous butynediol to butanediol is described. This process involves the hydrogenation of an aqueous mixture consisting essentially of about 20–70 percent by weight of butynediol and about 30–80 percent by weight of water at a temperature of about 60°–150°C. under a hydrogen pressure of about 2,500–5,500 psi. and a superficial gas velocity of at least about 0.5 foot per minute in the presence of a fixed-bed of granular, foraminous, nickel-aluminum catalyst which has been activated by removing about 5–30 percent of the aluminum from a nickel-aluminum alloy consisting essentially of about 35–60 percent by weight of nickel and about 40–65 percent by weight of aluminum.

The hydrogenation process should be carried out so as to convert butynediol to saturated products as completely as possible within practical limits. One of the primary uses for butanediol is in the production of tetrahydrofuran by dehydration as described in U.S. Pat. No. 2,251,835 and German Pat. No. 1,043,342. The presence of intermediate 2-butene-1,4-diol, hereinafter referred to as butenediol, in the hydrogenation product results in the formation of 2,5-dihydrofuran, hereinafter referred to as dihydrofuran, an undesirable impurity in the dehydration product. It is particularly desirable, therefore, that the amount of butenediol in the product be reduced to substantially zero during the hydrogenation.

When substantially fresh catalyst is being used in the hydrogenation, a temperature on the low side of the 60°–150° C. range should be used, and the butene diol content of the product should be maintained far below the tolerable maximum. After the catalyst has been used for an extended period of time it becomes increasingly less efficient with the result that the butenediol content of the product slowly rises until eventually it reaches the maximum that can be tolerated. When this occurs a major portion of the original efficiency of the catalyst can be restored by increasing the reaction temperature slightly, for example 1°–5°C., thereby significantly reducing the butenediol content of the product. After another extended period of operation, the butenediol content will again approach the tolerable maximum and the temperature can again be raised with a similar result. This stepwise raising of the temperature in response to the build-up of butenediol in the product can be continued until an exit temperature of about 150°C. is reached. At this point no further significant benefits are obtained by incrementally raising the temperature and the catalyst must be replaced with fresh catalyst if the product is to stay within specifications.

SUMMARY OF THE INVENTION

It has now been discovered that the efficiency for the conversion of butynediol to saturated products of a granular, foraminous catalyst which has been activated by removing about 5–30 percent of the aluminum from a nickel-aluminum alloy consisting essentially of about 35–60 percent by weight of nickel and about 40–65 percent by weight of aluminum can be increased after such efficiency has been reduced through extended use as a fixed-bed catalyst in the continuous hydrogenation of an aqueous mixture consisting essentially of about 20–70 percent by weight of butynediol and about 30–80 percent by weight of water at a temperature of about 60°–150°C. under a hydrogen partial pressure of about 2,500–5,500 psi. and a superficial gas velocity of at least about 0.5 foot per minute, measured as the hydrogen leaves the catalyst bed, by the process which comprises washing the catalyst with a wash medium consisting essentially of water, the volume of said wash medium being at least about 50 percent of the volume of the catalyst bed. Preferably the water washing is carried out in combination with a reduction in pressure to a pressure which is not more than about 90 percent of the reaction pressure, and the volume of the wash medium is at least equal to the volume of the catalyst bed. It is quite surprising that this simple expedient of water washing effects a substantial improvement in the efficiency of the catalyst.

DETAILED DESCRIPTION OF THE INVENTION

The method of this invention relates to a process which uses as its starting material an aqueous mixture consisting essentially of about 20–70 percent by weight of butynediol and about 30–80 percent by weight of water. The term "consisting essentially of," as used throughout the specification and claims, is meant to exclude only those unspecified ingredients or impurities which prevent the results of the invention from being realized. These aqueous mixtures are readily obtained by the well known reaction of acetylene and formaldehyde as described, for example, in U.S. Pat. Nos. 2,840,618; 2,871,273; 2,939,844 and 3,154,589. The amount of water and butynediol in the product will vary within the specified limits, depending upon the concentration of the aqueous formaldehyde used in the reaction, and whether or not, and to what extent, the product is concentrated by distillation. Crude butynediol products are conventionally subjected to a thermal separation wherein formaldehyde, some water, and other volatile products are removed and recycled to the reaction.

Preferably the feed material to the hydrogenation reaction described herein consists essentially of about 35–60 percent by weight of butynediol and about 40–65 percent by weight of water and most preferably about 50–60 percent butynediol and about 40–50 percent water. The preferred feeds often contain minor amounts of formaldehyde, but generally less than about 1 percent.

The hydrogenation process uses a fixed-bed of granular, foraminous, nickel-aluminum catalyst which has been activated by removing about 5–30 percent of the aluminum from a nickel-aluminum alloy consisting essentially of about 35–60 percent by weight of nickel and about 40–65 percent by weight of aluminum. Such catalysts are described in U.S. Pat. No. 2,950,260. These catalysts, unlike Raney nickel catalysts which have had all of the aluminum removed from the nickel-aluminum alloy, retain about 70–95 percent of the aluminum contained in the original alloy. This residual aluminum acts as a support for the nickel and allows the catalyst to retain the granular size characteristics of the original alloy, whereby it is suitable for use in a fixed-bed process. Preferably the nickel-aluminum alloy before activation consists essentially of about 40–45 percent by weight of nickel and about 55–60 percent by weight of aluminum.

Activation of the catalyst is generally carried out by treating the alloy with a dilute aqueous alkali solution which is fed at a temperature not in excess of 35°C. whereby not more than about 1.5 moles of hydrogen are evolved for each mole of alkali consumed. Alkali metal hydroxides such as sodium, potassium and lithium hydroxides are suitable for this use. Preferably the alkali is an aqueous solution containing about 0.25–1 percent by weight of sodium hydroxide and the exit temperature of the solution during activation does not exceed about 50°C. It is preferable to remove about 10–30 percent of the aluminum originally contained in the alloy since the resulting catalyst retains its efficiency somewhat longer than catalysts activated by the removal of less aluminum. When more than about 30 percent of the aluminum is removed, the active layer of foraminous nickel may flake off and plug the supporting screens of the catalyst bed or alternatively break up into small particles which may be carried off in the hydrogenated product.

The granular catalyst particles should have grain sizes in the range of about 1–14 mesh. The term "granular" is used herein to define catalysts consisting essentially of particles having sizes falling within these limits. Preferably the catalyst consists essentially of particles having grain sizes of about 2–10 mesh.

The hydrogenation reaction is generally carried out at a hydrogen partial pressure of about 2,500–5,500 psi. and a superficial gas velocity of at least about 0.5 foot per minute, measured as the hydrogen leaves the catalyst bed. With hydrogen pressures of less than about 2,500 psi. uneconomically large amounts of catalyst are required, the amount of butene-diol contained in the product increases significantly, and the catalyst is quickly deactivated. Pressures above about 5,500 psi. are not economical because they require special high pressure equipment. There is no upper limit on the gas velocity except that imposed by the requirement that the catalyst be fixed bed rather than fluidized. Preferably the hydrogen partial pressure is about 3,000–5,000 psi. and the superficial gas velocity is at least about 0.8 foot per minute.

The reaction temperature may vary from about 60°–150° C. When the temperature is less than about 60°C., uneconomically large amounts of catalyst are required to complete the reaction. Since the reaction is exothermic, the temperature measured at the reactor exit will be somewhat higher than at the reactor entrance. The temperature at the reactor exit should not exceed about 150°C. At temperatures above about 150°C., by-product formation principally n-butanol, becomes excessive. Preferably the reaction temperature is maintained at about 70°–145°C.

Since the hydrogenation reaction is exothermic it is necessary that heat be removed. This is conventionally accomplished by recycling a major portion of the reactor effluent back to the reactor with heat removal from the recycle stream. Preferably the recycle to fresh feed ratio is about 10–40:1, that is, in the range of about 10:1 to about 40:1. Most preferably the recycle to fresh feed ratio is about 15–25:1. Within this recycle range the temperature of the reactants fed to the reactor is preferably maintained at about 70°–125°C. With a recycle to fresh feed ratio of about 20:1, the temperature of the reactants fed to the reactor can be maintained constant by reducing the temperature of the recycle stream by about 23°C.

Of course, the invention is not limited to a recycle process since other methods of removing heat can be used. For example, the reaction could be carried out stepwise with heat removal between the steps. Inert diluents or excess hydrogen could also be used to further remove the heat of reaction.

The activated nickel-aluminum catalysts used herein are most active when used under non-acidic conditions. Accordingly, it is preferred that alkali be added to the reactants in sufficient amount to maintain a pH of about 6.5–8 at the reactor exit. The pH is specified "at the reactor exit" because it has been observed that the pH sometimes varies between the reactor feed point and the reactor exit. Control of the pH may be accomplished by adding alkali to the fresh butynediol feed, by adding alkali to the reactor effluent being recycled, or both. Suitable alkali for this use includes alkali metal hydroxides such as sodium, potassium and lithium hydroxides, and the like. Most preferably the pH at the reactor exit is maintained at about 7–7.5.

The hydrogenation may be carried out in a single stage or the process may involve two or more stages. In a preferred embodiment, butynediol is passed to a primary hydrogenation stage employing recycle, and the product of this stage, containing some butenediol, is passed to a supplemental hydrogenation stage using the same type of catalyst and conditions, but without recycle, to form a final product which is substantially free of butenediol. In this case it is necessary that the butenediol content of the product of the first stage be reduced to a very low level. The butenediol content of the first stage product should be maintained low enough that the temperature in the second stage can be controlled during conversion of the remaining butenediol to butanediol without recycle being necessary.

In accordance with this invention the efficiency of the catalyst can be increased after it has been reduced through extended use in the hydrogenation reaction by washing the catalyst with a wash medium consisting essentially of water. It is not necessary that the wash medium be pure water, but it should not contain any ingredients which materially detract from the result which would be obtained with pure water. For example, the aqueous feed material or the aqueous product stream should not be used for water washing.

Preferably the water washing is carried out in combination with a reduction in pressure to a pressure which is not more than about 90 percent of the reaction pressure. Although a substantial improvement in catalyst efficiency can be obtained by water washing at the reaction pressure, when the water washing is carried out in combination with a reduction in pressure considerably better results are obtained. In contrast, it has been found that reducing the pressure of the system to atmospheric without water washing has not significant effect upon the efficiency of the catalyst.

In order for the reduction in pressure to have any substantial effect it should be carried out in combination with the water washing. By "in combination with" it is meant that the pressure reduction may be before, during, or after the water washing but, when it is before or after the water washing, it should be sufficiently contemporaneous with the water washing that no substantial amount of reaction takes place in between. The extent of the improvement in catalyst efficiency will vary depending upon the degree of reduction in pressure. For best results the pressure should be reduced as far as practical. Preferably, the pressure is reduced to a pressure which is not more than about 50 percent of the reaction pressure and most preferably the reduced pressure is less than about 1,000 psi.

The volume of water passed through the catalyst bed should be at least about 50 percent of the volume of the catalyst bed for a significant result. Preferably the volume of water used is at least equal to the volume of the catalyst bed. Wash water volumes varying from 1–1,000 times the volume of the catalyst bed have been used without any substantial difference in the effect on catalyst efficiency.

Other variables in the water washing procedure are not critical. Such factors as the rate of flow, temperature, duration, and the use of recycle or once-through utilization of the water do not appear to have any substantial effect upon the results obtained. No difference in efficiency has been noted for wash water flow rates varying from 0.04 to 2 gallons per minute per cu. ft. of catalyst. The temperature of the water at the end of the water wash has been varied from 10°–130°C. with no apparent difference in effectiveness. Wash times have also been varied from 3 to 14 hours without any apparent difference in effectiveness.

The active life of the catalyst is maximized by using the catalyst at as low a temperature as is practical for as long as is possible without exceeding the maximum limit for intermediate butenediol in the product. The water washing of this invention is more effective with a catalyst whose efficiency was reduced through use at a relatively low temperature than with a catalyst used at a higher temperature. Therefore, the preferred procedure for extending the life of the catalyst is to use fresh catalyst at a low reaction temperature, for example 75°C., until it no longer is producing a product having an acceptable butenediol content. The catalyst is then water washed with pressure reduction in accordance with this invention. After water washing, the catalyst can again be used at 75°C. to produce specification product for another period of time. Alternate water washing and reuse at 75°C. can be continued until the degree of improvement in efficiency resulting from water washing has decreased to the point where it is no longer economically practical. At this point the temperature of the reaction is raised, for example to 76°–80πoc., with the result that specification product is again produced. When the butenediol content of the product again reaches the specification limit, another water wash may or may not have a beneficial effect. When the effectiveness of water washing diminishes to the point where it is no longer practical, raising the reaction temperature is the only means available for returning the butenediol content of the product to specification.

The following examples, illustrating the novel process disclosed herein for improving the efficiency of a nickel-aluminum catalyst used in the hydrogenation of butynediol to butanediol, are given without any intention that the invention be limited thereto. All parts and percentages are by weight.

EXAMPLE 1

A stainless steel reactor having a diameter of 1.125 inches and a 28-inch high catalyst bed (0.016 cu. ft.), used as a primary hydrogenation stage, is charged with 778 grams of 4–8 mesh 0.185–0.093 inch) nickel-aluminum catalyst which has been activated by removal of 25 percent of the aluminum from an alloy containing 42 percent nickel and 58 percent aluminum. Activation of the catalyst is accomplished by pumping 0.5 percent aqueous sodium hydroxide down through the reactor at a flow rate of 2 gallons per minute per cubic foot of catalyst on a once-through basis. The hydrogen evolved during the activation is removed from the bottom of the reactor. The inlet temperature of the caustic feed is 15°C. and the exit temperature averages approximately 16°C. Activation is accomplished in 16.5 hours with an average aluminum removal rate of 0.025 percent per minute. Caustic utility during the activation averages 52 percent.

Fresh feed, prepared by reacting two moles of aqueous formaldehyde with one mole of acetylene and containing 56 percent butynediol, 43 percent water, and 1 percent high boilers, is fed to the reactor at the rate of 34.2 lbs. of butynediol per cubic foot of catalyst per hour. The pH of the fresh feed is adjusted with caustic to about 7.3 measured at the reactor exit. Hydrogen is fed to the reactor at a hydrogen partial pressure of 3,800 psi. and a superficial gas velocity of 1 foot per minute, measured as the hydrogen leaves the catalyst bed. With the recycle to fresh feed ratio at 20:1, there is a 22°C. temperature differential within the reactor and product is recovered at the rate of 35.8 lbs. of butanediol per cu. ft. of catalyst per hour. The feed temperature is initially at 75°C.

During the run all operating conditions are held constant except for the inlet temperature which is increased periodically to maintain the butenediol bleed-through rate at a low level. Periodically during the run a sample of the product is analyzed to determine the butenediol content, measured as parts per million of dihydrofuran impurity, on the total organic basis, formed upon dehydration of the product to tetrahydrofuran.

At various times during the run the reaction is shut down, that is, pumping of the feed through the reactor is stopped. During some of these shutdowns either the reactor is depressurized, the catalyst is washed with water, or both. The water washes are carried out with distilled water at the rate of 0.1 gallon per minute per cu. ft. of catalyst at 25°C. for 4 hours on a once-through basis. Table I contains a tabulation of the shutdowns which involve depressurization, water washing, or both including data taken before the shutdown and after equilibrium is established following the shutdown.

TABLE I

| Before shutdown | | | During shutdown | | | After shutdown | | |
|---|---|---|---|---|---|---|---|---|
| Catalyst life, hr. | Temperature, °C. | Dihydrofuran, p.p.m. | Catalyst life, hr. | Pressure, p.s.i. | Water wash | Catalyst life, hr. | Temperature, °C. | Dihydrofuran, p.p.m. |
| 174 | 75–97 | 10,200 | 178 | 3,800 | Yes | 194 | 75–97 | 7,430 |
| 240 | 75–97 | 9,216 | 244 | 0 | Yes | 255 | 75–96 | 3,720 |
| 310 | 75–96 | 7,292 | 310 | 0 | No | 322 | 76–98 | 10,730 |
| 322 | 76–98 | 10,730 | 323 | 3,800 | Yes | 325 | 75–96 | 5,600 |

EXAMPLE 2

A stainless steel reactor having a 1.77-inch inside diameter and a catalyst bed 12 feet high (0.185 cu. ft.), used as a primary hydrogenation stage, is charged with 22 lbs. of 4–8 mesh (0.185–0.093 inch) nickel-aluminum catalyst which has been activated by the removal of 25 percent of the aluminum from an alloy containing 42 percent nickel and 58 percent aluminum. Activation of the catalyst is accomplished by pumping 0.5 percent aqueous sodium hydroxide up through the reactor on a once-through basis at a flow rate of 2 gallons per minute per cubic foot of catalyst. Hydrogen evolved during the activation is removed from the top of the reactor. The temperature of the caustic entering the reactor is 25°C. and the exit temperature averages about 32°C. The activation is continued for a total of 8 hours with an average aluminum removal of 0.052 percent per minute. Caustic utility during the activation averages 70 percent. Immediately after 25 percent of the aluminum has been removed, the catalyst is water washed with distilled water for 8 hours at a flow rate of 2 gallons per minute per cubic foot of catalyst. The pH of the effluent is 8.7 when the water washing is completed.

Fresh feed, prepared by reacting two moles of aqueous formaldehyde with one mole of acetylene and containing 56 percent butynediol, 43 percent water, and 1 percent high boilers, is fed to the reactor at the rate of 34.2 lbs. of butynediol per cubic foot of catalyst per hour. The pH of the fresh feed is adjusted with caustic to about 7.3 measured at the reactor exit. Hydrogen is fed to the reactor at a superficial hydrogen velocity of about 1 foot per minute, measured as the hydrogen leaves the catalyst bed, and at a hydrogen partial pressure of 3,800 psi. The recycle to fresh feed ratio is 20:1 and product is recovered at the rate of 38.5 lbs. of butanediol per cubic foot of catalyst per hour. The feed temperature is initially 75°C. and there is a 22°C. temperature differential within the reactor.

during the run all operating conditions are held constant except for the inlet temperature which is increased periodically to maintain the butenediol bleed-through rate at a low level. Periodically during the run a sample of the product is analyzed to determine the butenediol content, measured as parts per million of dihydrofuran impurity, on the total organic basis, formed upon dehydration of the product to tetrahydrofuran.

At various times during the run, the reaction is shut down. During some of these shutdowns either the reactor is depressurized, the catalyst is washed with water, or both. The water washes are carried out with distilled water at the rate of 0.1 gallon per minute per cubic foot of catalyst at 25°C. for 8 hours on a once-through basis. Table II contains a tabulation of the shutdowns which involve either depressurization, water washing, or both including data taken before and after the shutdown.

TABLE II

| Before shutdown | | | During shutdown | | | After shutdown | | |
|---|---|---|---|---|---|---|---|---|
| Catalyst life, hr. | Temperature, °C. | Dihydrofuran, p.p.m. | Catalyst life, hr. | Pressure, p.s.i. | Water wash | Catalyst life, hr. | Temperature, °C. | Dihydrofuran, p.p.m. |
| 12 | 75–97 | 1,830 | 14 | 1,000 | Yes | 27 | 75–97 | <950 |
| 27 | 75–97 | <950 | 27 | 3,800 | Yes | 37 | 75–97 | 564 |
| 80 | 70–94 | 2,400 | 81 | 0 | No | 96 | 75–97 | 1,860 |
| 187 | 76–98 | 8,000 | 189 | 0 | Yes | 198 | 76–97 | 3,700 |
| 210 | 77–100 | 4,370 | 212 | 0 | No | 218 | 75–96 | 3,650 |
| 218 | 75–96 | 3,650 | 218 | 0 | No | 228 | 76–97 | 2,825 |
| 347 | 76–98 | 10,300 | 350 | 3,800 | Yes | 357 | 75–98 | 7,970 |
| 404 | 80–102 | 10,100 | 405 | 0 | Yes | 415 | 80–102 | 6,100 |

EXAMPLE 3

A stainless steel reactor having a 1.77-inch inside diameter and a catalyst bed 12 feet high (0.185 cu. ft.), used as a primary hydrogenation stage, is charged with (22 lbs. of 4–8 mesh *0.185–0.093 inch) nickel-aluminum catalyst which has been activated by the removal of 8.3 percent of the aluminum from an alloy containing 42 percent nickel and 58 percent aluminum. Activation of the catalyst is accomplished by pumping 0.5 percent aqueous sodium hydroxide down through the reactor at a flow rate of gallons per minute per cubic foot of catalyst on a once-through basis. The temperature of the caustic entering the reactor is 25°C. and the exit temperature initially is about 45°C. and drops to 30°C. as the activation progresses. The activation is continued for a total of 1 hour and 23 minutes and the average caustic utility is 95 percent.

Fresh feed, prepared by reacting 2 moles of aqueous formaldehyde with 1 mole of acetylene and containing 50–55 percent butynediol and 45–50 percent water, is fed to the reactor at 90°C. The pH of the fresh feed is adjusted with caustic to about 7.3 measured at the reactor exit. Hydrogen is fed to the reactor at a hydrogen partial pressure of 3,800 psi. and a superficial gas velocity of 1 foot per minute, measured as the hydrogen leaves the catalyst bed. Initially the feed is charged at the rate of 17.1 lbs. of butynediol per cubic foot of catalyst per hour. The recycle to fresh feed ratio is initially 20:1 the temperature differential within the reactor is initially 22°C., and product is recovered initially at the rate of 17.9 lbs. of butanediol per cubic foot 17.1 catalyst per hour.

During the run all operating conditions are held constant except for the feed rate, the recycle to fresh feed ratio and the rate at which product is recovered. As the fresh feed rate increases and the recycle ratio decreases there is a resultant increase in temperature differential within the reactor. Between the 20th and 32nd hours of operation the fresh feed rate is increased to 24.7 lbs. of butynediol per cu. ft. of catalyst per hour with a corresponding decrease in the recycle to fresh feed ratio so as to provide 25.8 lbs. of butanediol per cu. ft. of catalyst per day. Between the 32nd and 44th hours of operation the fresh feed rate is 19.9 lbs. per cu. ft. of catalyst per hour. Between the 44th and 56th hours the fresh rate is again 17.1 lbs. of butynediol per cu. ft. of catalyst per hour. After 56 hours the fresh feed rate is increased to 19.9 lbs. of butynediol and then slowly decreased to 17.1 lbs. of butynediol over the next 28 hours. The fresh feed rate remains at 17.1 lbs. of butynediol per cu. ft. of catalyst per hour for the remainder of the run.

Periodically during the run a sample of the product is analyzed to determine the butenediol content, measured as parts per million of dihydrofuran. At various times during the run the reaction is shut down. During one of these shutdowns the reactor is depressurized. During another shutdown the reactor is depressurized and the catalyst is washed with well water containing 200 parts per million of calcium chloride for 8 hours at 25°C. at the rate of 0.1 gallon per minute per cubic foot of catalyst. The following data is obtained.

TABLE III

| Before shutdown | | | During shutdown | | | After shutdown | | |
| --- | --- | --- | --- | --- | --- | --- | --- | --- |
| Catalyst life, hr. | Temperature, °C. | Dihydrofuran, p.p.m. | Catalyst life, hr. | Pressure, p.s.i. | Water wash | Catalyst life, hr. | Temperature, °C. | Dihydrofuran, p.p.m. |
| 13 | 90–112 | 17 | 18 | 0 | No | 29 | 90–112 | 110 |
| 77 | 90–112 | 550 | 82 | 0 | Yes | 88 | 90–112 | 6 |

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

We claim

1. The method of increasing the efficiency of a granular, foraminous catalyst after such efficiency has been reduced through extended use in producing 1,4-butanediol by the continuous hydrogenation of an aqueous mixture consisting essentially of 20–70 percent by weight of 2-butyne-1,4-diol and 30–80 percent by weight of water in the presence of a fixed bed of said granular, foraminous catalyst, at a temperature of 60°–150° C. under a partial pressure of 2,500–5,500 ps and a superficial gas velocity of at least 0.5 foot per minute, measured as the hydrogen leaves the catalyst bed, said granular foraminous catalyst being a nickel-aluminum catalyst which has been activated by removing 5–30 percent of the aluminum from a nickel-aluminum alloy consisting essentially of 35–60 percent by weight of nickel and 40–65 percent by weight of aluminum, said method of increasing such efficiency consisting essentially of washing said catalyst with water, the volume of said wash water being at least 50 percent of the volume of the catalyst bed, said washing being carried out in combination with a reduction in pressure to a pressure which is not more than 90 percent of the reaction pressure.

2. The process of claim 1 in which the volume of the wash water is at least equal to the volume of the catalyst bed.

3. The process of claim 2 in which the pressure is reduced during water washing of the catalyst.

4. The process of claim 2 in which the reduced pressure used in combination with the water washing of the catalyst is not more than 50 percent of the reaction pressure.

5. The process of claim 4 in which the nickel-aluminum alloy consists essentially of 40–45 percent by weight of nickel and 55–60 percent by weight of aluminum, the catalyst consists essentially of particles having grain sizes of 2–10 mesh.

* * * * *

UNITED STATES PATENT OFFICE
CERTIFICATE OF CORRECTION

Patent No. 3,691,093   Dated September 12, 1972

Inventor(s) Herman J. Frank and Irving Moch, Jr.

It is certified that error appears in the above-identified patent and that said Letters Patent are hereby corrected as shown below:

Column 5, line 63, "76°-80&roc." should read --76-80°C.--.

Column 7, line 62, "during" should read --During--.

Column 8, line 38, "(22 lbs. of 4-8 mesh * 0.185-0.093 inch)" should read --22 lbs. of 4-8 mesh (0.185-0.093 inch)--.

Column 8, line 45, "of gallons" should read --of 2 gallons--.

Column 8, line 67, "foot 17.1 catalyst per hour" should read --foot of catalyst per hour--.

Column 9, line 14, "fresh rate" should read --fresh feed rate--.

Column 10, line 10, "2500-5500 ps" should read --2500-5500 psi--.

Signed and sealed this 13th day of August 1974.

(SEAL)
Attest:

McCOY M. GIBSON, JR.
Attesting Officer

C. MARSHALL DANN
Commissioner of Patents